United States Patent [19]
Huniu

[11] 3,724,499
[45] Apr. 3, 1973

[54] ANTI-CAVITATION SYSTEM FOR FLUID LOADING ARMS

[75] Inventor: Sam Huniu, Los Angeles, Calif.

[73] Assignee: FMC Corporation, San Jose, Calif.

[22] Filed: June 3, 1971

[21] Appl. No.: 149,681

[52] U.S. Cl. ................................. 137/615, 138/39
[51] Int. Cl. ............................................. F15d 1/04
[58] Field of Search ..137/615; 138/39; 285/181, 179

[56] References Cited

UNITED STATES PATENTS

| | | | |
|---|---|---|---|
| 3,434,491 | 3/1969 | Bily | 137/615 |
| 3,067,579 | 12/1962 | Olbrich | 285/181 |
| 2,662,553 | 12/1953 | Dimmock | 138/39 |
| 3,076,480 | 2/1963 | Vicard | 138/39 |

Primary Examiner—William R. Cline
Attorney—F. W. Anderson, C. E. Tripp and W. W. Ritt, Jr.

[57] ABSTRACT

A system of specially modified pipe elbows and a back pressure device to control cavitation in the fluid flowing through a fluid loading arm, thus minimizing noise generation and pipe vibration, and facilitating greatly increased flowrates. The arm's elbows contain one or more rigid vanes curved in the configuration of the flow passage through the elbow in which they are mounted, and the back pressure device comprises a cavitating venturi positioned at the discharge end of the arm. The venturi may be removable to provide unrestricted reverse flow through the arm when unloading fluid.

10 Claims, 4 Drawing Figures

PATENTED APR 3 1973

FIG_1

INVENTOR.
SAM HUNIU

BY C.E. Tripp -ATT'Y
-AGENT

PATENTED APR 3 1973 3,724,499

ANTI-CAVITATION SYSTEM FOR FLUID LOADING ARMS

BACKGROUND OF THE INVENTION

This invention relates to that field of art encompassing fluid loading arms, and more specifically the art appearing in Class 137, subclass 615 of the United States Patent classification system.

Fluid loading arms are now widely used throughout the world as a highly satisfactory means for transferring petroleum and its products, and various other liquids, between a reservoir and a transportation vessel, such as a marine petroleum tanker, a railroad tank car, or a highway tank truck. A loading arm generally comprises two, or sometimes more, sections of pipe pivotally joined end-to-end through elbows and swivel joints, mounted through more elbows and swivel joints at its inner end on a riser or other supporting pipe. An arm of this type employed in marine service also usually has two or three additional elbows interconnected by swivel joints as a universally pivotable outer or terminal means for coupling it to a marine tanker's manifold. A very significant factor limiting the flowrate through these arms is the severe vibration and noise that occurs when the fluid cavitates as it travels through the elbows, and in light of the constant demand to increase flowrates in order to reduce loading time this factor constitutes a major problem with this equipment. The step up to a larger diameter arm greatly increases the cost of the installation, and replacement of currently existing units with those of larger capacity can be so expensive as to rule out that type of improvement entirely. Consequently, until the advent of the present invention there existed a long-established, widespread need for an efficient and economical solution to this problem.

SUMMARY OF THE INVENTION

The present invention comprises the inclusion of one or more rigid, thin vanes in the elbows of the loading arm, and a fixed-area, cavitating venturi at the discharge or coupling end of the arm. The vanes are formed to the contour of the elbow's flow passages, are appropriately located in the elbows and welded or otherwise securely fixed thereto, and their leading and trailing edges are shaped to minimize local cavitation in the region. The vanes increase the local static pressure at the walls of the elbows, and also reduce the pressure loss along the inner bend radius across the elbows by minimizing flow separation and secondary flows. The cavitating venturi restricts flow through the arm just enough to induce higher pressures within the critical arm piping so that fluids with high vapor pressures do not flash and cause "hard" cavitation, which often occurs under conditions where downstream piping provides little or no flow restriction, as with the large diameter manifolding on larger size petroleum tankers. The venturi induces cavitation at its minimum area section with collapse of the vapor bubbles occurring within the fluid rather than on the equipment's surfaces. This form of cavitation results in a release of energy in high frequency, low amplitude levels rather than the severe vibration and disagreeable rock-like noise caused by "hard" cavitation that limits flowrates. In combination, the vanes and venturi function to maintain fluid pressures within the arm at a level sufficiently greater than the vapor pressure of the fluid so that cavitation at the elbows is prevented, thereby reducing noise generation and pipe vibration to a minimum and increasing operable flowrates to an unexpectedly high level.

Accordingly, one object of the present invention is to increase the flowrates that can be safely and efficiently achieved in fluid loading arms.

Another object of the present invention is to reduce noise generation and pipe vibration in a fluid loading arm to a minimum.

Another object of the present invention is to eliminate cavitation in the elbows of a fluid loading arm, and the flow-restricting vibration which such cavitation creates.

Yet another object of the present invention is to induce cavitation in the fluid downstream of the loading arm, where such cavitation does not present an obstacle to flow through the arm.

DESCRIPTION OF THE PREFERRED EMBODIMENTS

Figure 1:
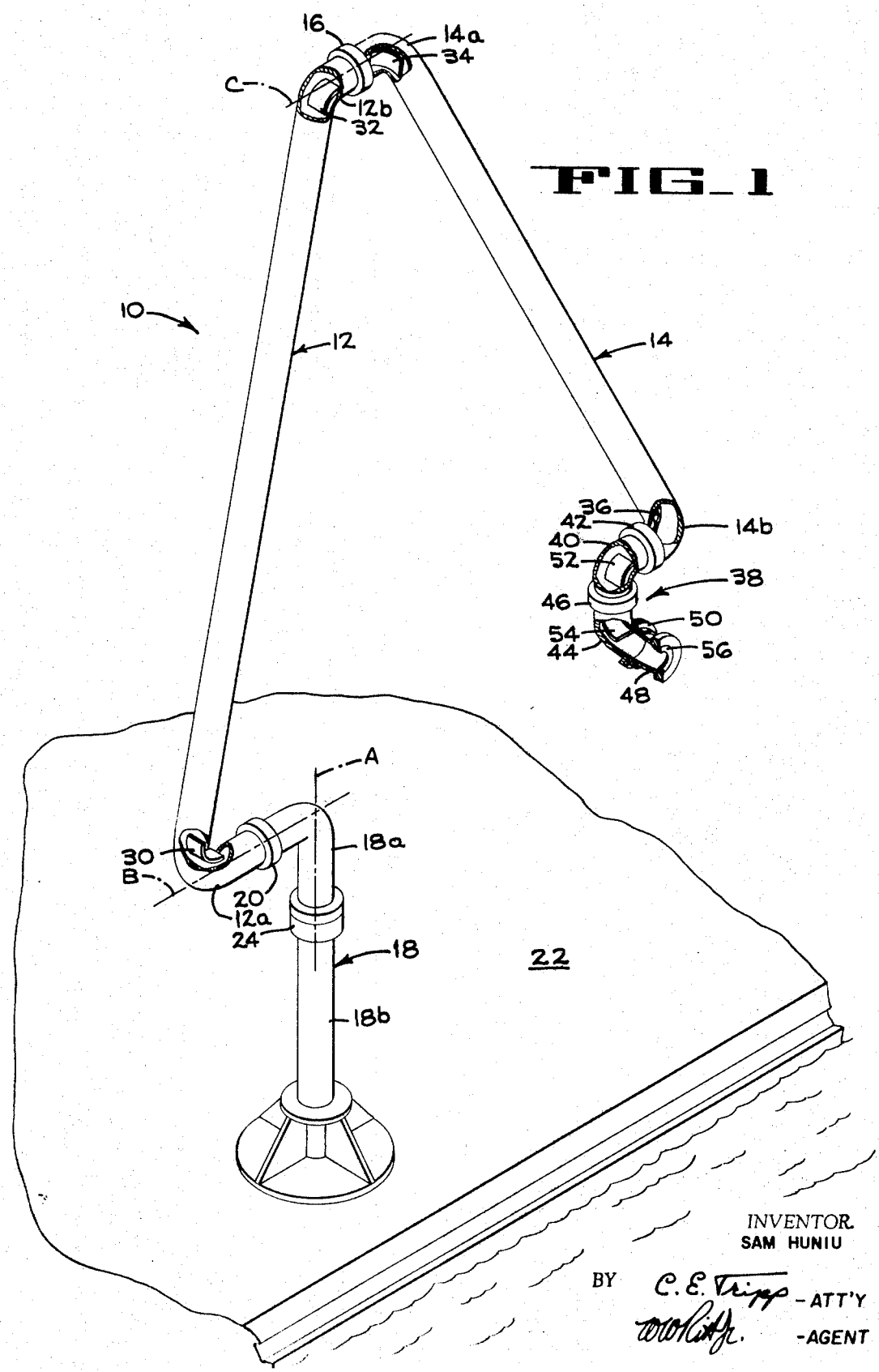
FIG. 1 is a diagrammatic view in perspective, with some parts broken away, of a fluid loading arm embodying the principles of the present invention, the arm installed on a wharf for marine service.

An embodiment of the invention in a fluid loading arm designed for use in transferring petroleum or other liquid cargo between a marine tanker and a shore-based reservoir facility is represented in FIG. 1. The loading arm 10 comprises an inner pipe section 12, an outer pipe section 14 pivotally connected through a swivel joint 16 to the inner section 12, and an upstanding riser section 18 to which the inner section 12 is pivotally connected by another swivel joint 20. The riser section 18 is mounted on a wharf 22, and suitable piping (not shown) extends from the riser to a reservoir (not shown) for storage of liquid cargo. The upper portion of the riser 18 comprises a 90° elbow 18a that is mounted on the lower straight portion 18b through a swivel joint 24 to facilitate slewing the arm about a vertical axis A.

A suitable counterbalancing mechanism for counterbalancing the inner and outer pipe sections 12 and 14 about the horizontal axis B, and the outer pipe section 14 about the horizontal axis C, normally is also included on this type of arm, but is not shown here for the sake of simplicity and since it is not critical to the present invention. Examples of counterbalancing mechanisms very suitable for this purpose are fully described and illustrated in U.S. Pat. Nos. 3,547,153 and 3,556,148, both to Peter J. Bily.

The end portions of the inner pipe section 12 are formed by pipe elbows 12a, 12b, and positioned in each of these elbows is a curved, rigid, metal or the like vane 30, 32, respectively. In like manner, the end portions of the outer pipe section 14 comprise pipe elbows 14a, 14b, each of which contains a curved vane 34, 36, respectively. If desired, a curved vane (not shown) also can be suitably positioned in the upper or elbow section 18a of the riser 18.

A coupling 38, comprising a first 90° pipe elbow 40 connected to the elbow 14b through a swivel joint 42, a second 90° pipe elbow 44 connected to the elbow 40 through another swivel joint 46, and a terminal flange section 48 connected to the elbow 44 by a third swivel joint 50, provides a universally pivotable means to couple the loading arm to a marine tanker's manifold (not shown) for transferring fluid between it and the shore-based reservoir. The elbows 40, 44 also contain a curved vane 52, 54, respectively, and a cavitating venturi 56 is positioned in the discharge end of the flange section 48.

Figure 2:
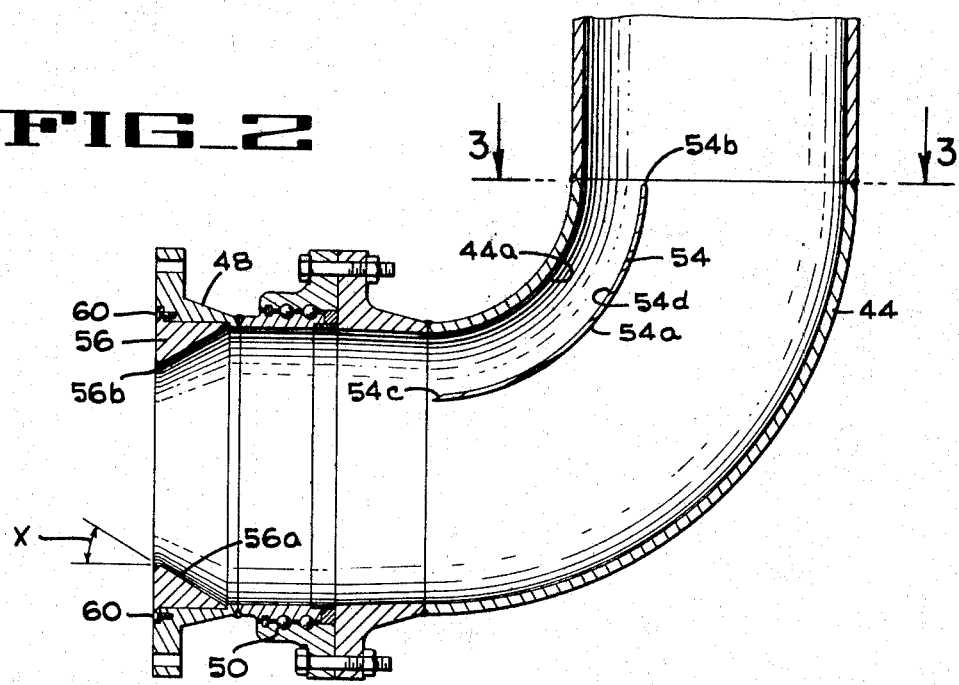
FIG. 2 is a view in vertical section, and on an enlarged scale, through the axis of the last elbow and swivel joint of the terminal coupling of the fluid loading arm of FIG. 1, showing a vane in the elbow and a cavitating venturi in the flanged end section that is bolted to a tanker's manifold when the arm is in use.
Figure 3:
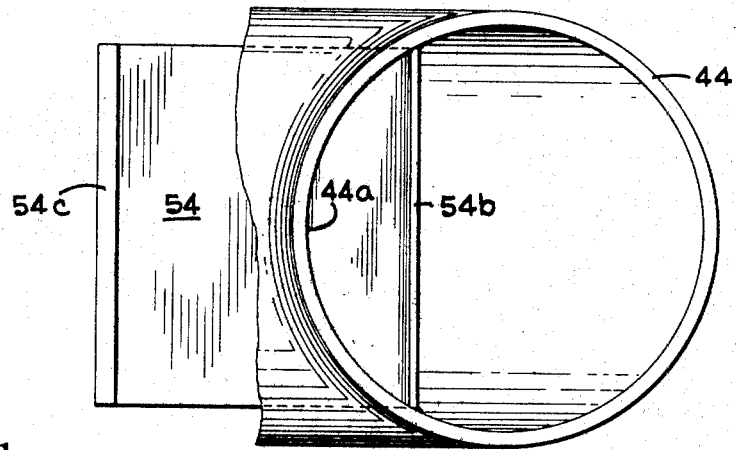
FIG. 3 is an enlarged view taken along the line 3—3 of FIG. 2, with a portion of the device broken away to more clearly show the vane.

As shown in FIGS. 2 and 3, the vane 54 in the elbow 44 is curved in its lengthwise direction to the configuration of the flow passage through the elbow, but it is straight in its transverse direction. The vane preferably extends the entire length of the elbows curved portion, and is welded or otherwise firmly secured to the wall of the elbow at a position where the velocity of the fluid along the vane's convex surface 54a substantially matches the velocity of the fluid along the elbow's short radius curved surface 44a.

Figure 4:
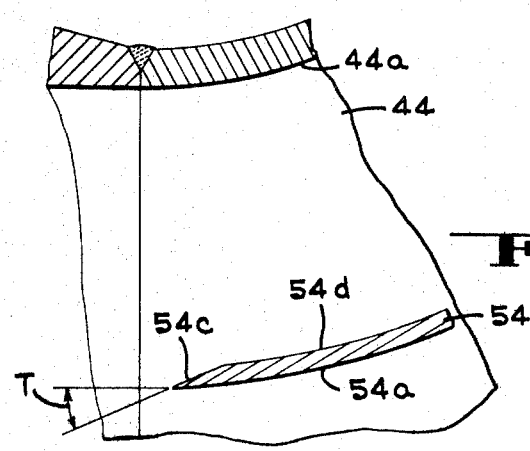
FIG. 4 is a fragmentary view, on an enlarged scale, of the trailing edge portion of the vane and adjacent elbow wall of FIG. 2.

In the illustrated embodiment the leading edge 54b of the vane 54 is rounded but it also can be shaped as an airfoil or in any other configuration that is aerodynamically clean. As seen best in FIG. 4, the vane's trailing edge 54c tapers from the inside out, i.e. from the vane's concave surface 54d to its convex surface 54a, at an angle T of between about 20° and 25°, with an ideal taper of about 22.5°.

The foregoing configuration and positioning parameters of the vane 54 apply equally to each of the vanes 30, 32, 34, 36, and 52, and of course also to the design of a vane for riser elbow 18a.

Although a single vane has been found to be the most efficient, and to produce fully the aforementioned highly beneficial results, a plurality of vanes can be mounted in any of the elbows of the loading arm if desired. For maximum performance each of the vanes should extend the full distance of the curved portion of the elbow's flow passage, and should have an aerodynamically clean leading edge and a tapered trailing edge as above explained. Each additional vane preferably is spaced from its shorter adjacent (i.e. inner) vane so that the flow velocity along its convex surface is substantially equal to that along the concave surface of that shorter vane.

The cavitating venturi 56 is best seen in FIG. 2, where it is shown as a removable unit interfitting with and secured to the flange section 48 by cap screws 60 or the like. The venturi can, of course, be formed integrally with the flange section 48, but by making it removable the moderate restriction it imposes on fluid flow can be eliminated when, for example, a marine tanker is to be unloaded and the venturi's function is not needed. The inlet angle X of the venturi's throat 56a is preferably shallow, with around 10° being optimum, but angles as great as 35° to 40° are also operable if the venturi's throat edge 56b is rounded off, as shown in FIG. 2. The size ratio of the inside diameter of the loading arm and the diameter of the venturi's throat edge 56b is dependent upon the flow rate desired downstream and the pressure desired upstream of the venturi, and thus can be varied to suit the needs of each installation.

The combination of a fixed-area, cavitating venturi at the discharge end of the loading arm and one or more properly configured and positioned vanes in the pipe bends or elbows functions to maintain fluid pressures within the arm at a level sufficiently greater than the vapor pressure of the fluid, and thus prevents the occurrence of cavitation at the elbow walls. The vanes effectively reduce the incidence of cavitation by increasing the local static pressure at the elbow walls, and also reduce the pressure loss along the inner or shorter bend radius across the elbow by minimizing flow separation and secondary flows. The venturi imposes a partial restriction on the flow through the arm, thus inducing higher pressures within the critical arm piping so that fluids with high vapor pressures do not flash and cause "hard" cavitation. Cavitation of the venturi is induced at the throat edge 56b, with collapse of the resulting vapor bubbles occurring within the fluid instead of on the walls of the loading arm itself. This form of cavitation results in a release of energy in high frequency, low amplitude levels, rather than in severe vibration and "rock-like" noise that is experienced when the invention is not employed.

The above described invention has been found to produce increases in flowrates of unexpected magnitude without the occurrence of "hard" cavitation and excessive pipe vibration. For example, tests on marine loading arms of 6 inch diameter indicate that by employing the principles of this invention virtual vibration-free flowrates of approximately 55 per cent greater than without the invention have been achieved without the production of unsatisfactory arm vibration or fluid cavitation.

Although the best mode contemplated for carrying out the present invention has been herein shown and described, it will be apparent that modification and variation may be made without departing from what is regarded to be the subject of the invention.

What is claimed is:

1. A fluid loading arm, comprising at least one arm section supported for pivotal movement about a generally horizontal axis, said arm section having a fluid-conducting flow passage terminating in a receiving end and a discharge end, said arm section including at least one curved pipe section forming part of said fluid-conducting flow passage, at least one rigid, curved vane mounted in the flow passage of the curved pipe section, said vane curved lengthwise in the configuration of the pipe section flow passage, and a cavitating venturi in the arm section's flow passage adjacent it's discharge end, whereby the combination of said vane and cavitating venturi facilitate significantly increased flow rates by preventing flow-restricting hard cavitation in the fluid flowing through said loading arm.

2. A fluid loading arm according to claim 1 wherein the vane extends the full length of the curved flow passage through the pipe section.

3. A fluid loading arm according to claim 1 wherein the vane has a leading edge with an aerodynamically clean configuration.

4. A fluid loading arm according to claim 3 wherein the leading edge is round.

5. A fluid loading arm according to claim 1 wherein the vane has a concave surface, a convex surface, and a trailing edge that is tapered from said concave surface to said convex surface.

6. A fluid loading arm according to claim 5 wherein the taper of the vane's trailing edge defines an angle of between approximately 20° and 25°.

7. A fluid loading arm according to claim 5 wherein the taper of the vane's trailing edge defines an angle of approximately 22.5°.

8. A fluid loading arm according to claim 1 wherein the cavitating venturi has a throat that defines an inlet angle of between approximately 10° and 40°.

9. A fluid loading arm according to claim 8 wherein the inlet angle is approximately 30°.

10. A fluid loading arm according to claim 8 wherein the inlet angle is no greater than approximately 40°, and the venturi has a rounded, annular throat edge at its minimum diameter.

* * * * *